Sept. 3, 1974  T. H. WETMORE ET AL  3,833,742
FOOD PRODUCT PACKAGE
Filed June 21, 1971 2 Sheets-Sheet 1
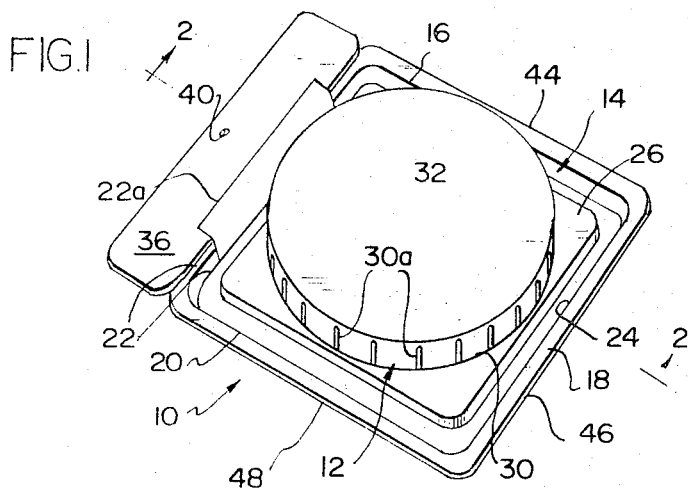
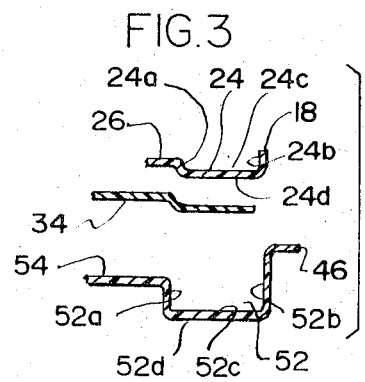
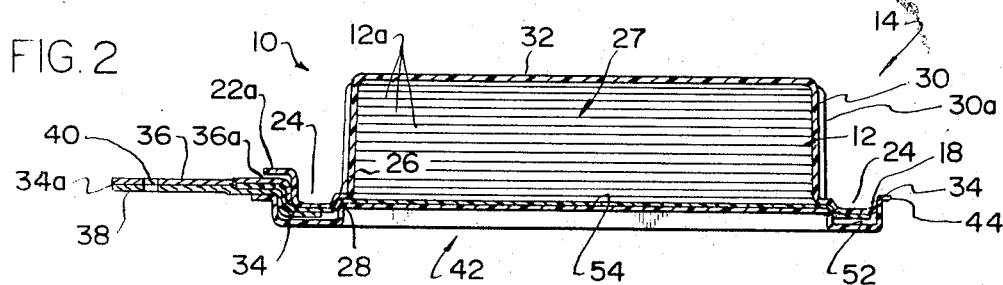
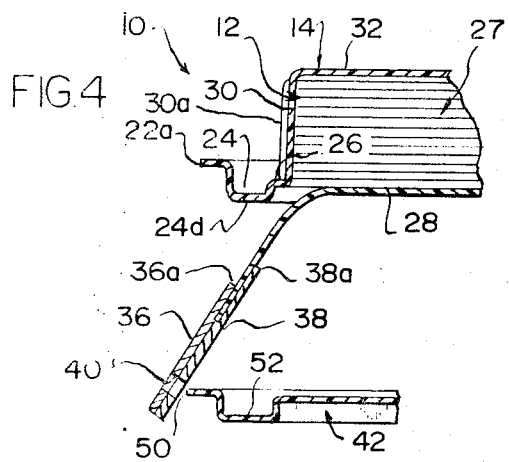
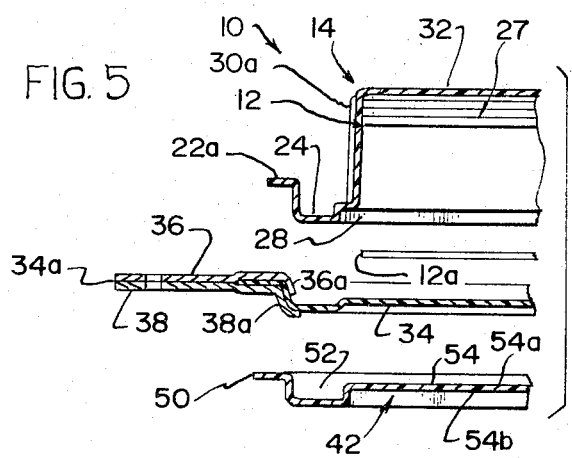
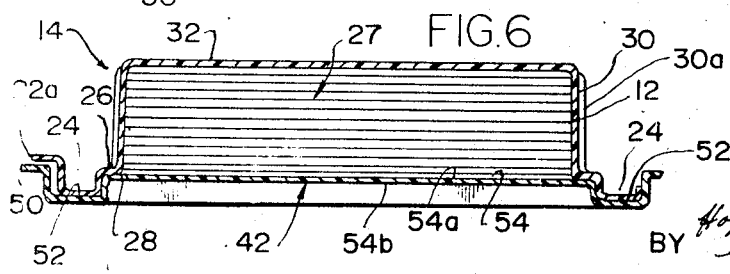
INVENTORS.
THOMAS H. WETMORE
RONALD L. DAVIS
ROLAND R. VAUGHN
BY Hofgren, Wegner, Allen, Stellman & McCord
ATTORNEYS.

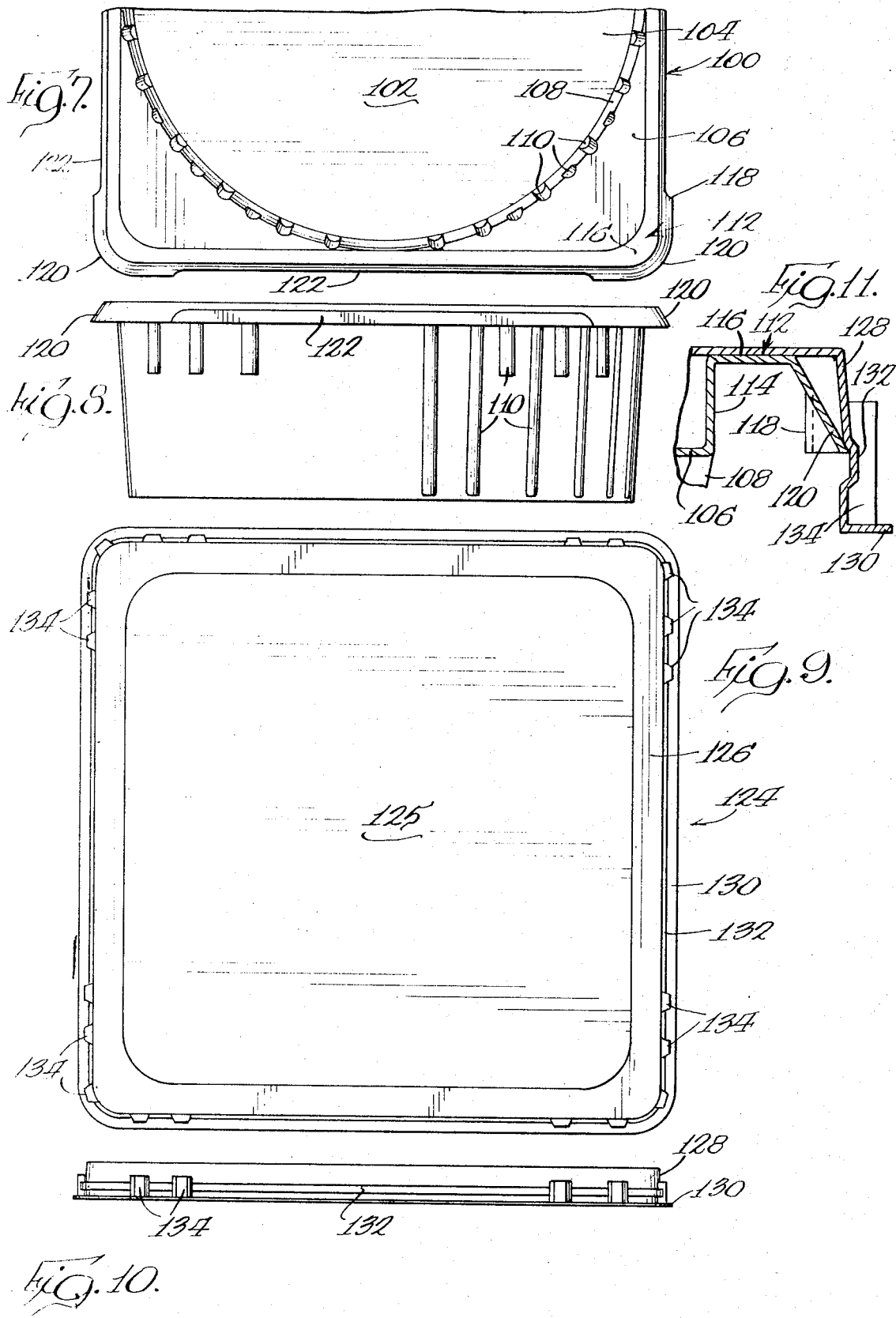

United States Patent Office 3,833,742
Patented Sept. 3, 1974

3,833,742
FOOD PRODUCT PACKAGE
Thomas H. Wetmore, Ronald L. Davis, and Roland R. Vaughn, Fort Wayne, Ind., assignors to Peter Eckrich & Sons, Inc.
Continuation-in-part of abandoned application Ser. No. 793,465, Jan. 23, 1969. This application June 21, 1971, Ser. No. 154,733
Int. Cl. B65b 25/06
U.S. Cl. 426—129
14 Claims

ABSTRACT OF THE DISCLOSURE

A package for stackable food products such as luncheon meat or the like including a shell having a food receiving and storage cavity and a peripheral bead, with an upraised handle on one portion of the bead; a sealing film across the cavity and releasably sealed to the shell peripheral bead with an extended portion of the film in the area of the handle; and a bottom panel having a peripheral recess mating with shell peripheral bead and nestably receiving the same therein.

CROSS-REFERENCE

This application is a continuation-in-part of our copending application Ser. No. 793,465, now abandoned filed Jan. 23, 1969, entitled "Food Product Package," and assigned to the same assignee as the instant application.

BACKGROUND OF THE INVENTION

This invention relates to preformed packages for sliced meat products or the like.

The abundance of prior art patents in the sliced meat packaging field are directed to a common goal of providing a package which adequately seals the product and satisfactorily displays it for vending, may be easily opened by the consumer and will satisfactorily protect the remaining contents after re-enclosure thereof. In addition, it is desirable that such packages bear advertising and descriptive material thereon. Some structures developed to arrive at these desirable results have been in the form of packages having shell-like tops with a meat receiving cavity and a peripheral flange, and a semi-rigid bottom having a peripheral channel which generally mates with a peripheral flange or bead at the top. Examples of such structures are found in the Seiferth Patent 3,086,689; 3,108,005; 3,221,692; Hein Patent 3,087,923 and Coller Patent 3,229,810.

In each of these prior art structures, the periphery of the package is closely spaced from, and generally follows the shape of, the meat receiving cavity. This results in a lack of area for advertising or descriptive material and in the lack of a means for facilitating the opening of the package. In some of these structures, a plastic film is interposed between the shell and the bottom panel, but removal of the film is difficult in that no satisfactory means is provided for grasping the film to remove the same.

Thus, a need and a desire has arisen for a package having a shell with a peripheral bead and a bottom panel with a mating peripheral channel and in intervening film therebetween with a means facilitating the initial separation of the film from the shell to gain initial access to the interior of the meat cavity in the shell, and also for such a package having provision for advertising or descriptive material in an area outside of the shell cavity.

SUMMARY OF THE INVENTION

This invention is directed, in brief, to the provision of an improved meat package of the type having a shell and a bottom panel with a mating bead and channel structures and a layer of intervening film, wherein the film and shell have grasping areas facilitating initial separation of the film from the shell and wherein at least one of the film and shell further have areas for advertising and descriptive material adjacent the grasping means.

The best mode currently contemplated by us for carrying out the invention includes the provision of a semi-rigid shell having a platform having a peripheral bead. The platform has a central embossment defining a meat receiving cavity with an open bottom. A grasping tab projects outwardly along one portion of the bead. A film spans the bottom of the shell, in sealing engagement with the bead portion thereof and has a projecting tongue in the area of the shell tab. Advertising and descriptive literature may be placed on the tab and tongue. A bottom panel underlies the film, having a peripheral channel which mates with the shell peripheral bead. Access is gained to the interior of the meat receiving cavity by grasping the respective tabs and separating the film from the shell. Re-enclosure of the package is accomplished by superimposing the shell and bottom panel with the peripheral bead of the shell nestably received in the peripheral channel of the bottom panel.

DESCRIPTION OF THE DRAWINGS

FIG. 1 is a perspective view of a package embodying this invention;

FIG. 2 is a section view taken generally along the line 2—2 of FIG. 1;

FIG. 3 is a fragmentary enlarged exploded sectional view of a portion of FIG. 2 showing the relationship of the peripheral bead of the shell and the peripheral channel of the bottom panel;

FIG. 4 is a fragmentary exploded sectional view of a the initial separation of the bottom film from the upper portion of the meat package as shown in FIG. 2, showing shell of the meat package following the removal of the bottom panel to gain access to the interior of the cavity;

FIG. 5 is a fragmentary sectional exploded view showing the condition of the package when the bottom film is removed to expose the cavity interior and enable the withdrawal of a slice of meat therefrom;

FIG. 6 is a view similar to FIG. 2 showing the package in a re-enclosed condition following the removal of the desired quantity of food product;

FIG. 7 is a fragmentary plan view of a modified embodiment of the invention;

FIG. 8 is a side elevation of the modified shell;

FIG. 9 is a plan view of a modified embodiment of a panel intended for use with the shell shown in FIGS. 7 and 8;

FIG. 10 is a side elevation of the modified bottom panel; and

FIG. 11 is a fragmentary vertical section illustrating the cooperation between the modified shell and the modified bottom panel.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

DESCRIPTION OF THE PREFERRED EMBODIMENTS

The food product package 10 of this invention is intended for use in retaining a food product 12 such as the individual meat slices 12a. Package 10 includes a shell 14 preferably preformed of a semi-rigid clear plastic to satisfactorily hold the contents 12a therein and to permit the viewability of the contents by a prospective purchaser.

In the illustrated embodiment, the shell has four edges defining the periphery thereof, edges 16, 18, 20 and 22. Whereas the illustrated embodiment shows the package as having a generally rectangular periphery, it is to be understood that any other suitable shape could be utilized, such as round, hexagonal or the like. One edge, 22, is provided with an upper and outwardly extending tab 22a which is generally integral therewith. Immediately inwardly of the peripheral edge of the shell there is a continuous channel 24 comprised of spaced inside and outside walls 24a and 24b, respectively, with an intervening bottom wall 24c thereby providing a downwardly projecting exterior bottom surface or peripheral bead 24d. Immediately adjacent the upstanding interior walls 24a of the channel 24, the shell is provided with an upraised platform portion 26.

A food product storage chamber or meat storage cavity 27 projects upwardly from, and generally medially of, platform portion 26 of shell 14. Cavity 27 has an open bottom 28 and a generally frusto-conical upstanding wall 30 defining the lateral extent of the cavity. As shown, the cavity 30 may be provided with small circumferentially spaced slightly outstanding ribs 30a. The cavity has a top 32 which spans the frusto-conical wall 30 to enclose the cavity at the top.

A bottom cover member, preferably in the form of a flexible plastic film 34, spans the open bottom 28 of the food product cavity 27 as well as the area of the shell defined by the peripheral extent thereof. Preferably the film is secured to the peripheral bead 24d by suitable means, such as adhesives or heat sealing, with the understanding that the securing means is releasable to gain access to the interior of the package when desired. One end of the film, preferably that end which is adjacent the tab 22a, is provided with an outwardly projecting tongue 34a. On its upper surface, the tongue may be provided with a paper-like or thin cardboard-like strip of material 36a on which there may be suitable advertising or descriptive literature. In addition, on the undersurface of tongue 34a there may be provided a lower layer of paper-like or cardboard-like material 38 on which there may also be descriptive or advertising literature. Film 34 is securely held between layers 36 and 38 so that the film and layers in combination provide a tab means. The usual aperture 40 may be formed through layers 36, tongue 34a and layer 38 to provide a means for impaling the package on a suitable spindle-like member for hanging or stacking purposes.

A tray-like bottom panel 42 having flanged edges 44 46, 48 and 50 underlies the shell 14 and film 34. A continuous channel 52 is formed closely inwardly from the edges 44, 46, 48 and 50 of the panel 42. It is to be understood that whereas the panel is shown herein as being generally rectangular in configuration it may take any other suitable configuration, with the further understanding that it is intended that the channel 52 of the panel 42 will generally mate with the channel 24 and the bead 24d of shell 14. To this end, channel 52 is provided with spaced interior and exterior walls 52a and 52b which are spaced apart a distance substantially similar to the exterior dimension between the walls 24a and 24b of channel 24. Between walls 52a and 52b is the interior surface 52c of the channel bottom and its corresponding exterior surface 52d. The depth of the channel 52 is, understandably, intended to be such as to complement the channel 24 in a nestable relationship therewith. Adjacent interior wall 52, the bottom panel 42 is provided with an upwardly displaced platform portion having an upper surface 54a and a lower surface 54b, the platform portion underlying and preferably being nestably received within, the platform 26 of shell 14.

In use, to gain access to the interior of the meat containing cavity 27, a user may grasp the tab formed by the layers 36, tongue 34a and layer 38 in one hand and the tab 22a in the other hand, after withdrawing the bottom panel 42 from the underside of the package. The user may then peel the plastic film 34 away from the underside of the tray 14, generally as shown in FIG. 4. As shown in FIG. 5, after the film has been separated from the bottom of the shell 14, the desired quantity of meat slices 12a may be removed through the open bottom 28 from cavity 27. After the desired quantity of slices has been removed, the package may be re-enclosed by merely nesting the bottom tray 42 against the underside of the upper shell 14 as shown in FIG. 6. It is to be understood, that if desired, the plastic film could be re-inserted between both the shell and the bottom panel 42, but this is not considered to be essential in that the mating nestable relationship of the channels 24 and 52 insures a sufficient seal against ambient environment and the upper surface 54a of the platform portion 54 supports the remaining quantity of the meat in a stacked condition as shown in FIG. 6.

FIGS. 7–11 illustrate a modified embodiment of the invention wherein a better grip between the shell and the bottom panel is provided and wherein the bottom panel is provided with a uniquely configured array of stacking ribs so as to facilitate denesting of the same from a stack in an automated packaging line. While not shown in FIGS. 7–11, the film 34 is, of course, employed in the embodiment therein shown in the same relation to the shell and bottom panel as in the embodiment of FIGS. 1–6.

The shell employed in the modified embodiment is identical to the shell 32 illustrated in FIG. 1 with the exception that the tab 22a need not be provided and the configuration of the peripheral edge is changed. With reference to FIGS. 7 and 8 the modified shell is generally designated 100 and includes a storage cavity 102 defined by a top 104 connected to a platform 106 by an upstanding wall 108. The wall 108 may be provided with outstanding ribs 110 for the purpose of rigidifying the same against collapse when vacuum is applied to the contents of the packages.

The platform 106 is surrounded by channel 112 defined by a relatively short upstanding wall 114 connected integrally to the platform 106 and outwardly extending web 116 and a depending locking element 118, all as best viewed in FIG. 11.

Returning to FIGS. 7 and 8, the downturned lock element 118 is outwardly flared at the corners of the package as illustrated at 120 while intermediate the corners, the same is generally vertically arranged as at 122. As a result, the flared portions 120 project outwardly a slight distance further than all other portions of the general periphery of the package.

Turning now to FIGS. 9–11, the panel for the shell 100 will be described. Again, the same is generally similar to the panel 42 with the exception that means are provided on the same for cooperating with the flared portions 120 to provide a firm lock and a unique arrangement of stacking ribs is provided to facilitate denesting in automatic packaging lines. More particularly, the panel is generally designated 124 and includes a cover 125 having a peripheral channel 126 adapted to overlie the shell 100. Extending downwardly from the periphery of the channel 126 are side walls 128 which terminate in outwardly directed flanges 130. The side walls 128 and flanges 130 are peripherally continuous about the panel 124.

Intermediate the channel 126 and the flange 130, each side wall 128 is provided with an outwardly struck bead 132.

Additionally, each of the corners of the panel 124 is provided with a series of outwardly struck stacking ribs 134. The stacking ribs are located in the position shown in FIG. 9 which are briefly described as follows. Referring to the uppermost left-hand corner, two of the ribs 134 are located on the uppermost wall 128 while two are located on the left side wall 128. A fifth lug is located at the junction of the two walls and positioned at an angle of about 45° to a line transverse to either one of the walls.

At the lower left-hand corner, again there are provided two of the ribs 134 on the adjacent side walls but the centermost rib is located at an angle of about 75° from a line drawn transverse to the lowermost side wall.

The upper right-hand corner has spacing ribs 134 configured similarly to the lower left-hand corner.

The lower right-hand corner is generally similar except that the centermost spacing rib 134 is located at an angle of about 15° to a line drawn perpendicular to the right side wall 128.

As a result of the foregoing construction, a plurality of the panels 124 may be stocked with minimum likelihood of frictional nesting between adjacent panels. The spacing ribs 134 insure that the panels 124 may be easily stripped singly off a stack of the same in a packaging line.

Turning to FIG. 11, the cooperation of the bead 132 with the flared portions 120 will be seen. In particular, when the panel 124 is fitted over the shell 100, at each of the corners, the flared portions 120 lodge in the bead 132 thereby providing positive retention of the panel 124 on the shell 100. The inherent resiliency of the materials used permits the panel 124 to be easily removed from the shell 100 simply by grasping the former and pulling slightly outwardly whereupon the flared portions 120 will disengage from the bead 132. In reapplying the panel 124 to the shell 100, the former need only be pressed downwardly on the latter to cam the flared portions 120 slightly inwardly until they are received within the bead 132 to provide the positive lock.

What is claimed is:

1. A package for retaining food products such as sliced meat or the like comprising: a semi-rigid shell having an upper and lower surface and a peripheral edge, wall means in the shell defining a food product receiving cavity, said cavity opening downwardly toward the lower surface of the shell; a semi-rigid bottom panel below the shell lower surface generally mating with said shell in assembled relationship therewith; and a closure panel interposed between said bottom panel and the shell, the closure panel being separate from said bottom panel and removably secured to said shell and further including a tongue associated therewith for facilitating the separation of the shell and closure panel to gain access to the shell cavity; said shell having a downwardly projecting bead adjacent the peripheral edge thereof; said bottom panel having a peripheral channel of a size and shape to nestingly receive the shell bead; said shell further having an upraised platform adjacent the peripheral bead; the bottom panel having an upraised platform of a size and shape to matingly nest within the shell platform and support the food product thereon; the closure panel being a plastic film interposed between the shell and the bottom panel; the shell bead comprising a channel-like peripheral edge of the shell including an interior wall which projects downwardly from the shell platform, a generally laterally extending channel bottom, and an upwardly extending channel bottom, and an upwardly extending exterior wall; the bottom panel channel including an interior wall which projects downwardly from the bottom panel platform, a channel bottom which extends laterally outwardly from the interior wall an exterior wall which extends upwardly from the bottom channel, with the bottom channel walls being of a size and shape to snugly nestably receive the shell member peripheral bead defined by the shell channel; said shell further having a tab comprising an extension of a portion of the exterior wall of the channel, the tab having a portion bent outwardly away from the exterior wall; the closure panel tongue underlying and extending outwardly beyond the shell tab.

2. The package of claim 1 wherein the closure panel tongue has literature bearing material thereon.

3. The package of claim 1 wherein the tongue is interposed between two panels of literature bearing material.

4. A package for retaining food products such as sliced meat or the like comprising: a semi-rigid shell having an upper and lower surface and a peripheral edge, wall means in the shell defining a food product receiving cavity, said cavity opening downwardly toward the lower surface of the shell; a semi-rigid bottom panel below the shell lower surface generally mating with said shell in assembled relationship therewith; and a closure panel interposed between said bottom panel and the shell, the closure panel being separate from said bottom panel and removably secured to said shell and further including grasping means associated therewith for facilitating the separation of the shell and closure panel to gain access to the shell cavity; said peripheral edge being polygonal in shape and including outwardly flared corners; and said semi-rigid bottom panel including a channel in which said peripheral edge may nest, one of the sides of said channel including a peripheral bead in which said outwardly flared corners are engagingly received, said outwardly flared corners and said peripheral bead comprising locking means.

5. A package for retaining food products such as sliced meat or the like comprising: a semi-rigid shell having an upper and lower surface and a peripheral edge, wall means in the shell defining a food product receiving cavity, said cavity opening downwardly toward the lower surface of the shell; a semi-rigid bottom panel below the shell lower surface generally mating with said shell in assembled relationship therewith; and a closure panel interposed between said bottom panel and the shell, the closure panel being separate from said bottom panel and removably secured to said shell and further including grasping means associated therewith for facilitating the separation of the shell and closure panel to gain access to the shell cavity; said shell peripheral edge being polygonal in shape and including outwardly flared corners; and said semi-rigid bottom panel including a channel in which said peripheral edge matingly nests, one of the sides of said channel including a peripheral bead at least at the corners of the channels corresponding to the corners of the peripheral edge.

6. A package for retaining food products such as sliced meat or the like comprising: a semi-rigid shell having an upper and lower surface and a peripheral edge, wall means in the shell defining a food product receiving cavity, said cavity opening downwardly toward the lower surface of the shell; a semi-rigid bottom panel below the shell lower surface generally mating with said shell in assembled relationship therewith; and a closure panel interposed between said bottom panel and the shell, the closure panel being separate from said bottom panel and removably secured to said shell and further including grasping means associated therewith for facilitating the separation of the shell and closure panel to gain access to the shell cavity; both said shell and said bottom panel having complementary, polygonal peripheral shapes and said bottom panel including a plurality of stacking ribs in the corners, the pattern of stacking ribs at one corner being dissimilar from the configuration of stacking ribs at at least two different corners.

7. The package of claim 6 wherein said polygonal shape is a rectangle and wherein the pattern of stacking ribs at two opposite corners is identical one to the other and the pattern of stacking ribs at each of the other corners is different from each other and from said opposite corners.

8. A package for retaining food products or the like comprising: a semi-rigid shell having an upper and lower surface and a peripheral edge, wall means in the shell defining a food product receiving cavity, said cavity opening toward one of the surfaces of the shell, said peripheral edge being generally directed away from said cavity; a semi-rigid cover panel generally mating with said shell one surface in assembled relationship therewith; a closure panel interposed between said cover panel and the shell and sealingly engaging the latter for sealing a food product in said cavity, said closure panel being separate from said cover panel and removably secured to said shell, said cover panel including an angular flanged portion extending about a major portion of said peripheral edge, said flanged portion including an outwardly directed, inwardly opening bead about at least a portion of its periphery in which at least a portion of said peripheral edge is received when said flanged portion is flexed relative to the remainder of said cover panel, said portion of said peripheral edge and said bead comprising removable locking means for holding said cover panel on said shell whereby said package may be reclosed by said cover panel after said closure panel has been partially or wholly removed to assist in maintaining the freshness of foods received in said cavity.

9. A package according to claim 8 wherein a portion of one of said peripheral edge and said flanged portion includes flared portions.

10. A package according to claim 8 wherein said bead extends substantially about the entire periphery of said flanged portion.

11. A package for retaining food products or the like comprising: a semi-rigid shell including wall means defining a food product receiving cavity, said cavity opening downwardly and being surrounded by a peripheral edge; a semi-rigid replaceable closure panel having a flanged edge generally mating with said shell about the peripheral edge thereof in assembled relationship therewith; a sealing closure panel interposed between said replaceable closure panel and said shell, said sealing closure panel being separate from said replaceable closure panel and removably secured in sealing relation to said shell to close and seal said cavity adjacent said peripheral edge; grasping means attached to said sealing closure panel and extending externally of said replaceable closure panel and said shell for facilitating separation of the shell and said sealing closure panel to gain access to the shell cavity; and locking means for removably locking said replaceable closure panel to said shell including an outwardly struck peripheral bead projecting from the flanged edge of said replaceable closure panel receiving end engaging at least a portion of said peripheral edge.

12. A package for retaining food products or the like comprising: a semi-rigid plastic shell including wall means defining a food product receiving cavity, said cavity opening downwardly and being surrounded by a peripheral edge; a semi-rigid plastic replaceable closure panel generally mating with said shell about the peripheral edge thereof in assembled relationship therewith; a plastic film sealing closure panel interposed between said replaceable closure panel and said shell, said sealing closure panel being separate from said replaceable closure panel and removably secured in sealing relation to said shell to close and seal said cavity adjacent said peripheral edge; grasping means attached to said sealing closure panel defined by an integral tongue of said sealing closure panel and extending externally of said replaceable closure panel and said shell for facilitating separation of the shell and said sealing closure panel to gain access to the shell cavity; and locking means for removably locking said replaceable closure panel to said shell wherein said shell has a bead adjacent the peripheral edge thereof and projecting away from said cavity, said replaceable closure panel including a peripheral channel having spaced apart side walls for nestably receiving said shell bead; and said locking means includes an outwardly struck bead in at least a portion of the periphery of the outermost channel wall of said replaceable closure panel for receiving at least a portion of the peripheral edge of said shell.

13. A package according to claim 12 wherein said shell peripheral edge is rectangular in shape and wherein the corners thereof are flared outwardly relative to the remainder of the peripheral edge, said outwardly struck bead in said outermost channel wall being provided at each of the corners of said replaceable closure panel for receipt of said flared corners.

14. A package according to claim 13 wherein said shell peripheral edge is square in shape and wherein said replaceable closure panel includes a plurality of stacking ribs at each of the corners thereof, the pattern of stacking ribs at one corner being dissimilar from the pattern of stacking ribs at at least two other corners.

References Cited

UNITED STATES PATENTS

| | | | |
|---|---|---|---|
| 1,484,195 | 2/1924 | Sexton | 220—29 |
| 2,787,399 | 4/1957 | Herman | 220—42 C |
| 3,172,768 | 3/1965 | Toosten | 99—174 X |
| 3,229,810 | 1/1966 | Gollen | 99—174 X |
| 3,396,899 | 8/1968 | Strouse | 220—53 X |
| 3,454,158 | 7/1969 | Tigner | 99—174 X |
| 3,467,244 | 9/1969 | Mahaffy | 99—174 UX |
| 3,498,018 | 3/1970 | Seiferth | 99—174 X |

FOREIGN PATENTS

| | | | |
|---|---|---|---|
| 25,353 | 4/1913 | Norway | 220—53 |
| 270,992 | 1/1930 | Italy | 220—53 |

ROBERT HALPER, Primary Examiner

U.S. Cl. X.R.

220—53